No. 12,667. REISSUED JUNE 25, 1907.
G. H. SARGENT.
CAR REPLACER.
APPLICATION FILED APR. 2, 1907.
2 SHEETS—SHEET 1.
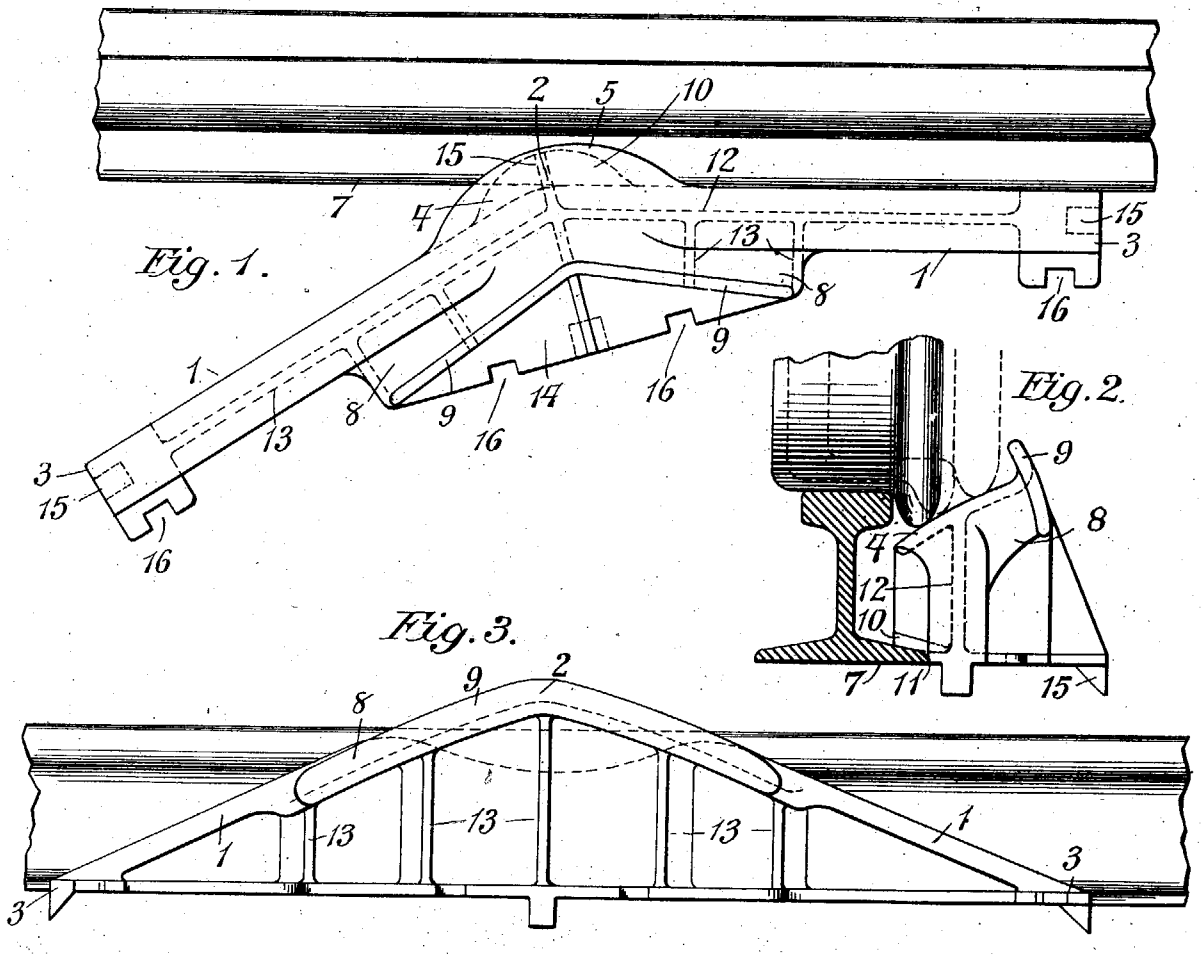
Witnesses:
Edward C. Rowland
James Gillin
George H. Sargent Inventor
By his Attorneys Stewart & Stewart
THE NORRIS PETERS CO., WASHINGTON, D. C.

No. 12,667. REISSUED JUNE 25, 1907.
G. H. SARGENT.
CAR REPLACER.
APPLICATION FILED APR. 2, 1907.
2 SHEETS—SHEET 2.
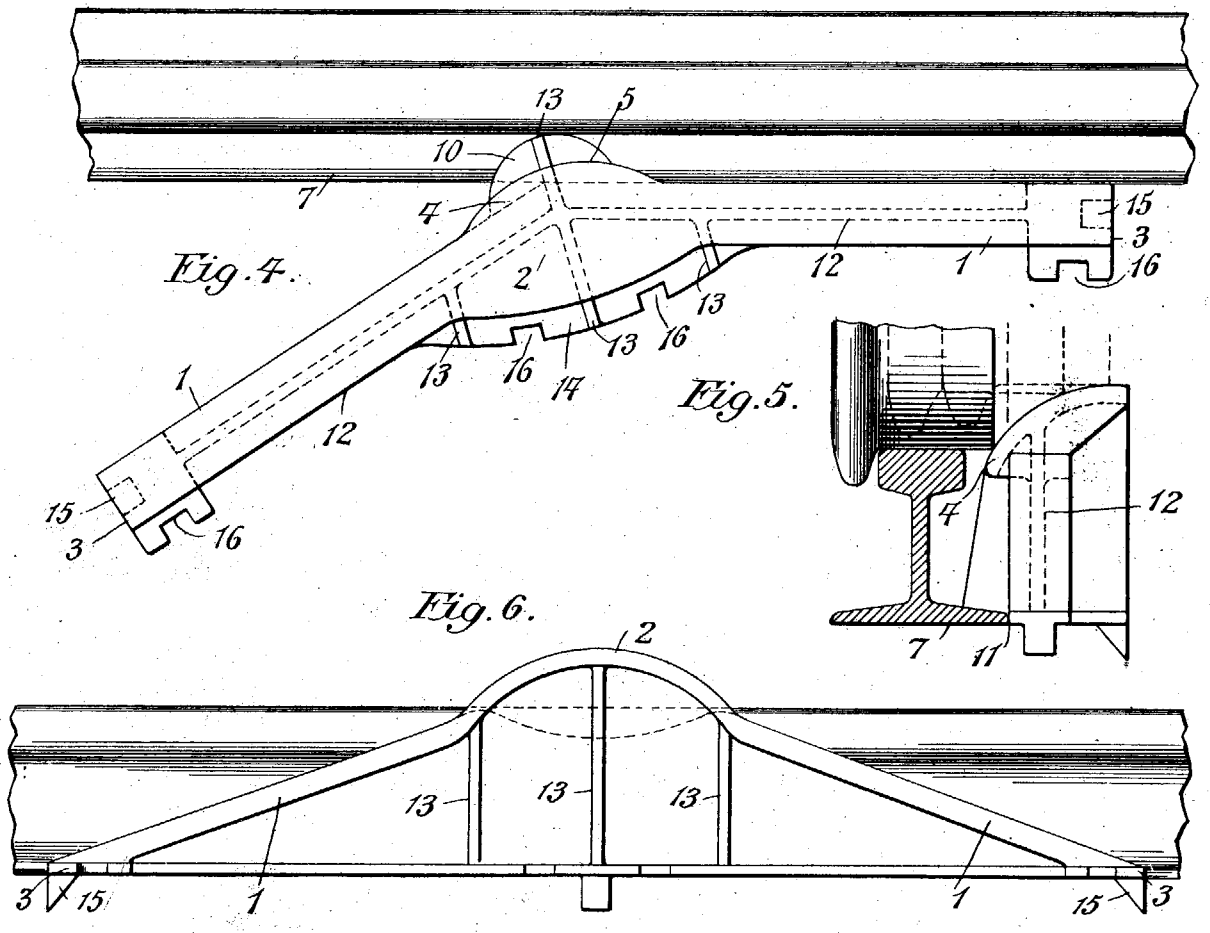
Witnesses:
Edward Rowland
James Gillin
George H. Sargent Inventor
By his Attorneys Steuart & Steuart
THE NORRIS PETERS CO., WASHINGTON, D. C.

UNITED STATES PATENT OFFICE.

GEORGE H. SARGENT, OF FLUSHING, NEW YORK.

CAR-REPLACER.

No. 12,667. Specification of Reissued Letters Patent. Reissued June 25, 1907.

Original No. 804,983, dated November 21, 1905. Application for reissue filed April 2, 1907. Serial No. 366,046.

*To all whom it may concern:*

Be it known that I, GEORGE H. SARGENT, a citizen of the United States of America, and a resident of Flushing, Long Island, State of New York, have invented certain new and useful Improvements in Car-Replacers, of which the following is a specification.

My invention relates to wrecking frogs, or means for replacing upon the rails, derailed cars and the like. Devices of this character are extensively used; and consist of blocks upon which the derailed wheels are rolled until at the necessary elevation for delivery to the rails, the blocks ordinarily being so shaped or designed as to automatically deliver the wheel to the rail at this point.

All wrecking frogs of which I am aware are objectionable in one or more features, impairing their usefulness, or increasing their cost of manufacture, or both. Not uncommonly the frogs are of very considerable weight. This feature makes their cost unnecessarily great, and increases the likelihood of their loss, as trainmen will leave them on the track in preference to returning them to the caboose after use. On the other hand, where the frogs have not been heavily constructed they have been liable to destruction by the weight of the cars. The frogs as heretofore designed have been subject to great local strains. Commonly they have had to take the full weight of the wheel from the flange of the latter, and because of the circumferential curvature of the wheel, and the transverse curvature of the face of the flange, this weight has thus been transmitted to a single point of the frog, with the result that the frog has often been cut into and broken, or the flange itself broken. Again, there has often been difficulty in getting wheels into a starting position on the frogs. Unless the frogs are angularly adjustable with respect to the rail, the wheel trucks have generally had to be moved angularly or laterally until in position to be engaged by the frogs. Furthermore, because of the local strains referred to, the pick up ends of the frogs have heretofore been of considerable thickness, and this in conjunction with the fact that the derailed wheel flanges are usually embedded in the ties, has necessitated a lifting of the wheels, as by means of wedges, to give the flanges a preliminary seating upon the pick-up ends of the frog; all of which is a troublesome operation and has not uncommonly resulted in displacement or breaking of the frog, besides entailing the cost of the wedges, which are almost invariably rendered worthless by a single usage.

With the object of avoiding all the faults of the previously existing replacing devices, I have invented a frog in which excessive local strains are entirely eliminated. My frog, instead of receiving the full weight of the wheels on a single point defined by the wheel flange, and furthermore of receiving this excessive strain at the pick up ends where the frog is weakest, engages in the first instance the wheel treads, and does not engage the wheel flanges until the wheels are well up on the frogs, or are about to slide onto the rails. By thus avoiding the cutting and breaking action of the wheel flanges, I am able to make my frog much lighter than has heretofore been possible. Furthermore my frog is so designed that there is no abutment of either wheel flange or tread against the end of the frog as the wheel comes into the same. In my invention the frog is cut away at the sides so that the wheel flange does not engage the frog until after the wheel is lifted; and furthermore the tread engaging surface by which the wheel is first lifted is so tapered or formed as to be readily slipped under the wheel tread as the wheel rests on its flange on the ties, whereby the first impact of the tread is a downward pressure on top of the frog instead of a lateral blow against the end of it. This feature is of great importance because in addition to obviating the necessity of lifting the tread onto the frog, it avoids that "end blow" on the frog which so often displaces and breaks the same. In fact in my invention the downward pressure of the car in the first instance tends to hold the frog against displacement.

In the use of my invention it is simply necessary to place the pick up end of the frog under the tread of the wheel and then pull the car. The tread of the wheel is never embedded, as is the flange, and therefore without the necessity of any lifting, the wheel may be rolled up the incline of the replacing frog and onto the rail, as hereinafter to be described.

Because of its peculiar and novel structure, my frog, combines great strength with lightness. Heretofore where attempts have been made to lighten the frogs by making the same hollow with supporting ribs or webs, the structures have assumed what may be termed a "shed" form, that is to say, a form in which a wide bearing surface is supported by a number of transverse ribs. This "shed" structure seems to be incidental to old style of frogs, because of the manner in which the wheels are received and supported thereon. In changing the principle of operation of the frog, I have been enabled to do away with the shed structure, and have substituted therefore, an I rail structure in which the chief surface supporting element is a single longitudinal brace. Besides being much lighter than the old "shed" structure, my I rail structure is much stronger, as the supporting braces are better disposed with respect to the strains to be resisted. I consider the I rail formation an important element of my invention.

These and other advantages and objects of my invention I attain by means of the construction illustrated in the accompanying drawings wherein Figures 1, 2, and 3, show respectively a top plan, an end elevation, and a rear side elevation of the inside frog in co-operative relation to the wheel inside the track. Figs. 4, 5 and 6 are corresponding views representing respectively a top plan view, an end elevation and a rear side elevation of the outside frog.

As above stated, it is of great importance that the frog be capable of adjustment in the line with the plane of the wheel, so as to make unnecessary any lateral sliding of the wheel before it is properly elevated to drop upon the rail. The throwing-off nose or delivery surface of the frog should therefore be so formed that whatever the angular position of the frog to the rail, the wheel easily slides onto the latter when sufficiently elevated. To this end it will be seen upon reference to the drawings that each of the frogs is provided with two extensions 1 angularly disposed with reference to each other and sloping downwardly and outwardly from the center 2 of the frog at a long wedge shaped incline to the pick-up ends 3 thereof. At the center of the frog, these inclines are united by the throw-off nose or delivery surface 4. The throw-off nose is shown as rounded at 5 whereby whatever the angular adjustment of frog, the nose will be in proper position with respect to the head of the rail. The nose is also shown as protruding beyond the lower flange, 7, of the rail into a position adjacent to the head of the rail, whereby when the wheel slides down the nose, its tread is thrown over the rail and its flange against the head thereof.

Referring to Figs. 1, 2 and 3, it will be seen that an extension or incline 8 extend alongside of the upper portion of the incline 1. This incline 8 terminates at its upper end flush with the surface of the nose 4, but tapers more rapidly than the incline, so that at its lower end, the incline 8 is at a lower elevation than the surface 1 by an amount about equal to the depth of the wheel flange. The inclines 1 are the tread engaging surfaces, and the inclines 8, the flange engaging surfaces of the frog. In order that the car wheel may first be engaged at the treads and on top of the same, the inclines 1 are extended beyond and below the surfaces or inclines 8, as shown in the drawings. In order that the pick-up ends may be slipped under the treads and then there may be no abutment of the tread against the end of the frogs, the surfaces 1 are of a long gradual taper, forming with the base of the frog a long thin wedge, having a narrow or pointed extremity. In this respect my frog differs from all other frogs when considered in connection with the other elements which go to make up my replacer. At the side away from the rail the inclines 8 are provided with flanges or guides 9 to guide and retain the wheel flange. The guides 9 flare outwardly and downwardly so that no matter what the position of the wheel treads on the frogs, when first engaged by the latter, the wheels will be guided properly onto the nose by the engagement of the wheel flange with the guide 9. In order that the frog may have a firm and unyielding support and in order that a proper position of the frog with reference to the rail may be readily determined, it is provided on its lower front face with a nose or supporting ledge 10, adapted to rest upon the base of the rail, and having a shoulder 11 to determine the lateral position of the frog with respect to the rail.

In operation, the frog is first given the proper angular adjustment to bring it into the plane of the wheel and is placed with its pick-up end 3 under the tread of the wheel, and with the supporting nose 10 in place upon the flange of the rail with the shoulder 11 against the same. The wheel is then pulled up the incline 1 and the wheel flanges thus lifted out of their position of derailment on the ties. After the wheel has traveled some distance up the incline, the wheel flange comes into engagement with the incline 8, and the weight of the wheel is thus removed from the tread to the flange. The relative angle of the inclines 1 and 8 is preferably such that there is no abrupt lift or blow on the frog where the wheel flange engages the surface 8, but on the contrary the transfer from tread to flange is gradual. The wheel then continuing upward, its flange engages the guide 9, and guided by the latter the wheel flange passes off the incline 8 and onto the nose or delivery surface 4, whereupon as indicated in Fig. 2, the wheel slides toward the rail, the wheel tread passing over the rail and the wheel flange bringing up in proper position against the side thereof.

The structure shown in Figs. 4, 5 and 6 in general respects resembles that shown in Figs. 1, 2 and 3, but being on the outside of the rail is designed to throw the wheel flange entirely over the rail, as shown in Fig. 5 instead of against it as shown in Fig. 2. In the outside frog there is no incline 8 with its guide for the wheel flange, but the wheel tread passes on up the incline 1 until it reaches the nose 2, when the flange has been elevated to the requisite distance above the rail, whereupon in contradistinction to the case of the inside frog the wheel tread, instead of the wheel flange, passes down the incline of the nose 4. The structure of Fig. 4 is like that of Fig. 1 in that it is cut away at the side of the tread incline so that in both instances the wheel is first engaged and lifted by its tread. In the latter instance however, the tread engagement continues until the wheel is delivered to the throw-off nose. As the wheel tread slides down the nose, as shown in Fig. 5, to take its proper position on the rail, the wheel flange passes entirely over the rail, and into position on the other side of the rail seating the tread in proper position on the rail head. It will be noted that in my outside frog the wheel tread is gradually lifted into its proper position on the nose. There is no abrupt contact of the tread with the nose; nor, as is commonly the case in the art, is the tread lifted by means of the flange to an elevation above the nose before it engages the latter. Where, as in the latter instance, the flange by first coming into contact with the nose, raises the tread above the same, the frog is subjected to a severe blow by the fall of the tread onto the nose when the wheel starts to slide down this incline. The blow thus delivered to the frog is a serious one and is inherent to the style of frog commonly in use. By cutting my frog inward from the line of the nose and by designing my tread surface as shown, I am enabled to entirely avoid this fault.

For peculiar lightness and strength, and particularly to design the frog so that it may be made of cast steel, I have constructed it on the plan of an I rail construction, as hereinbefore mentioned. The wheel engaging surfaces or bearings are thin plates supported upon longitudinal braces 12, forming the I construction, and upon cross braces 13, uniting with a lateral extension 14 to the base plate, whereby additional strength is provided with particular reference to the resistance of any transverse strains. A strengthening brace 15, similar to the braces 13, extends from the nose 2 to the supporting nose 10 and unites with the longitudinal braces 12, the frog at its center being of a convex shed construction of great strength because of the use of braces extending upward from base to bearing surface in contradistinction to mere webs.

When the wheel reaches the nose or delivery surface and starts to slide down the same to the rail, an outward thrust is exerted upon the frog by the wheel, tending to force the frog away from the rail. To prevent the frog being forced away from the rail, and to prevent its being shoved forward by the wheel as the latter ascends the incline, the frog is provided on its under surface with teeth or claws 15, which are sunk into the ties, and which in conjunction with spikes driven into the ties and fitting in pockets 16, secure the frog from displacement.

Whereas I have shown and described a structure well adapted to embody the principles and accomplish the objects of my invention, as hereinbefore first set forth, it is obvious that in certain respects the structure shown in the drawings may be modified without departing from the invention.

I claim

1. A wrecking frog provided with two inclined extensions set at an angle with each other and connected by a rounded nose projecting over the rail flange and beyond the lines of the extensions, for throwing the wheel upon the rail.

2. A wrecking frog provided with two inclined extensions set at an angle with each other and connected by a nose projecting over the rail flange and beyond the lines of the extensions, for throwing the wheel upon the rail.

3. In a wrecking frog the combination with the two end inclines set at an angle with each other, and a rounded sloping nose projecting beyond the side lines of the inclines.

4. In a wrecking frog the combination with the two end inclines set at an angle with each other, and a sloping nose projecting beyond the side lines of the inclines.

5. A wrecking frog adapted to fit alongside the rail and independent of the rail head, comprising an inclined portion to engage the tread of the wheel and a laterally flared flange to engage the flange of the wheel when the tread is elevated to the height of the rail, substantially as described.

6. A wrecking frog adapted to fit alongside the rail and independent of the rail head, comprising an inclined portion to engage the tread of the wheel and a laterally extending flange to engage the flange of the wheel, and means to deliver the wheel so elevated onto the track.

7. In a wrecking frog the combination of the inclined surface 1, the supplementary incline 8, and the rounded outwardly projecting head 2 having the guard flange 9, substantially as described.

8. A wrecking frog comprised of two inclined portions and a rounded outwardly projecting bearing surface on top and a base plate, and vertical webs connecting the two, one of which directly supports the projection, whereby the metal is used only at the point where pressure is to be withstood, substantially as described.

9. A wrecking frog comprised of two inclined portions and an outwardly projecting bearing surface on top and a base plate, and vertical webs connecting the two, one of which directly supports the projection, whereby the metal is used only at the point where pressure is to be withstood, substantially as described.

10. A wrecking frog having an inclined bearing face, a rounded head, and an inwardly projecting nose thereon extending over the rail flange, and a cross web and base directly supporting said nose on the rail flange substantially as described.

11. A wrecking frog having an inclined bearing face, a throwing off nose, and an inwardly projecting nose thereon extending over the rail flange, and a cross web and base directly supporting said nose on the rail flange substantially as described.

12. A pair of wrecking frogs having means for engaging both wheels upon the tread portion, a guard to prevent the sliding backward off the frog, and means for throwing the wheels upon the rail, including a projecting nose extending over the flange of the rail, substantially as described.

13. A wrecking frog comprising a flat supporting base to engage the ties, vertical webs to support the bearing surfaces, an inclined bearing surface, and a rounded head at the center of the frog having a forwardly projecting point extending over the flange of the rail.

14. A car replacer comprising two inclined angularly disposed extensions and a connecting head of rounded contour having a round nose projecting over the rail flange.

15. A car replacer comprising two angularly disposed extensions and a connecting head of rounded contour having a nose projecting over the rail flange, and supported directly on the rail flange, to avoid sinking into the soft wooden ties when in action.

16. A car replacer having a wheel flange engaging surface, and a wheel tread engaging surface at a slant such that by the engagement therewith of the wheel tread, the wheel is gradually elevated, and the flange engaging surface being so disposed as to engage the flange only after the wheel has been appreciably raised by the tread surface.

17. A car replacer having a wheel tread engaging surface, and a wheel flange engaging surface, the tread engaging surface being disposed in advance of the flange engaging surface whereby the wheel is first engaged and lifted by the tread engaging portion of the replacer.

18. A car replacer having a wheel tread engaging surface, and a wheel flange engaging surface, the tread engaging surface extending outward beyond the flange engaging surface whereby the wheel is first engaged and lifted by the tread engaging portion of the replacer.

19. A car replacer having a wheel tread engaging surface, and a wheel flange engaging surface, the tread engaging surface being disposed below the flange engaging surface whereby the wheel is first engaged and lifted by the tread engaging portion of the replacer.

20. A car replacer having a wheel tread engaging surface, a wheel flange engaging surface, and a throw-off nose or surface sloping laterally toward the rail to deliver the wheel thereto, the tread and the flange engaging surface extending downward from the throw off surface at different angles or curves, such that the wheel is first engaged and lifted at the tread, and then engaged at the flange and by the latter lifted to the delivery surface.

21. A car replacer having means for engaging the tread of the wheel and lifting the wheel from the ground and means for subsequently engaging the flange of the wheel, removing the wheel from its first engaging means and lifting it to the proper height for delivery to the rail.

22. A car replacer having means for engaging the tread of the wheel and lifting the wheel from the ground, and means for subsequently engaging the flange of the wheel, removing the wheel from its first engaging means and lifting it to the proper height for delivery to the rail, and means for sliding the wheel onto the rail.

23. A car replacer comprising an inclined extension by which the wheel is first engaged at its tread and lifted on to the frog and a sloping throw-off surface projecting beyond the side lines of the extension.

24. A car replacer having a wheel tread-engaging surface, a wheel flange engaging surface, and a sloping throw-off surface or nose, the flange engaging surface having a laterally flaring flange for guiding the wheel to proper position on the throw-off surface.

25. A car replacer having a wheel tread engaging surface and being cut away at either side of said surface, a throw-off surface or nose, and a wheel flange engaging surface, the flange engaging surface extending from the throw-off surface to a point on the replacer alongside of and intermediate the tread engaging surface and arranged to transfer the weight of the car from the tread to the flange engaging surface at said point on the replacer, and an outwardly flaring guide on the flange engaging surface for guiding the wheel flange to proper position on the throw-off nose regardless of the position originally assumed by the wheel on the tread engaging surface.

26. A car replacer having a bearing surface, a sloping throw-off surface or nose, a base and a brace extending longitudinally of said bearing surface and uniting the same to the base, whereby the whole forms an I-rail structure.

27. A car replacer having a bearing surface, a sloping throw-off surface or nose, a base and a brace uniting the bearing surfaces to the base and extending in the line of advance of the wheel over the bearing surfaces, whereby lateral strains and turning moments on the brace are avoided.

28. A car replacer having a surface for advancing the wheel up the replacer, a throw-off surface or nose sloping transversely to the wheel lifting surface, a base, a brace uniting the lifting surface to the base and extending in the line of advance of the wheel up the replacer, a second brace uniting the throw-off surface to the base, and extending in the line of the advance of the wheel whereby turning moments on the supporting brace are avoided.

29. A car replacer provided with means consisting of a tapering wedge adapted to pass under the tread of the wheel when placed in position and to elevate the wheel as it advances on such tapering support in combination with means to receive and support the wheel by its flange when the wheel is advanced on the tapering tread and means to deliver the wheel to the track.

30. In a car replacer a wedge having a gradually inclined tread engaging surface and an extremity sufficiently narrow to be inserted under the wheel tread when the wheel is resting on its flange, in combination with means for engaging the wheel flange to lift the wheel from the wedge and deliver it to the rail.

31. In a car replacer, a wheel tread-engaging portion in the form of a wedge located entirely to one side of the rail and having an extremity sufficiently narrow to be inserted under the wheel tread when the wheel is resting on its flange, in combination with means for relieving the tread-engaging surface of the wheel and delivering the latter laterally to the rail.

32. A car replacer provided with means consisting of a tapering wedge adapted to pass under the tread of the wheel when placed in position and to elevate the wheel as it advances on such tapering support in combination with a laterally sloping surface or throw-off nose for delivering the wheel to the rail, and a flange engaging surface extending from the throw off nose alongside of the tapering wedge and so inclined as to lift the wheel from the wedge and onto the throw-off nose.

33. A car replacer comprising a casting having a double wedge form, each end of the wedge having an incline with a surface to engage the flange of the wheel but with a short portion of the surface being raised to engage the tread only of the wheel, and the apex of the wedge being a continuous slanting surface to allow of freely sliding the flange on to the rail after it has been elevated, substantially as described.

Signed by me this 12th day of March 1907.

GEORGE H. SARGENT.

Witnesses:
JACOB I. BERGEN,
WM. L. MORRIS.